United States Patent
Hirai et al.

(10) Patent No.: US 7,606,640 B2
(45) Date of Patent: Oct. 20, 2009

(54) COOLING APPARATUS AND PROJECTION TYPE DISPLAY DEVICE

(75) Inventors: Koji Hirai, Tokyo (JP); Yoshitake Kondo, Kanagawa (JP); Akira Nishiyama, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/290,937

(22) Filed: Nov. 30, 2005

(65) Prior Publication Data

US 2006/0145949 A1    Jul. 6, 2006

(30) Foreign Application Priority Data

Nov. 30, 2004   (JP)   ............................ P2004-346642

(51) Int. Cl.
*G06F 19/00* (2006.01)
(52) U.S. Cl. .................. 700/300; 700/299; 353/52; 353/57; 353/61; 353/119; 349/5
(58) Field of Classification Search ................ 700/300, 700/299; 353/52, 57, 61, 119; 349/5; 361/695
See application file for complete search history.

(56) References Cited

U.S. PATENT DOCUMENTS

| | | | | |
|---|---|---|---|---|
| 6,055,489 A * | 4/2000 | Beatty et al. | ................ | 702/130 |
| 6,257,007 B1 * | 7/2001 | Hartman | ........................ | 62/183 |
| 6,396,344 B1 * | 5/2002 | Gentzler et al. | ............. | 330/149 |
| 6,447,146 B1 * | 9/2002 | Skinner et al. | .............. | 362/294 |
| 6,499,960 B2 * | 12/2002 | Chen | ........................... | 417/32 |
| 6,709,111 B2 * | 3/2004 | Hirao et al. | .................... | 353/52 |
| 6,809,780 B2 * | 10/2004 | Sawai et al. | ................. | 348/748 |
| 6,979,086 B2 * | 12/2005 | Hu | ............................... | 353/57 |
| 7,040,762 B2 * | 5/2006 | Yasuda | ........................ | 353/52 |
| 7,131,731 B2 * | 11/2006 | Oketani | ....................... | 353/57 |
| 7,151,349 B1 * | 12/2006 | Williamson et al. | ......... | 318/254 |

FOREIGN PATENT DOCUMENTS

| | | |
|---|---|---|
| JP | 04-060534 A | 2/1992 |
| JP | 2001-193688 A | 7/2001 |
| JP | 2002-364583 A | 12/2002 |
| JP | 2003-043577 A | 2/2003 |
| JP | 2003-101274 A | 4/2003 |
| JP | 2003-153570 A | 5/2003 |
| JP | 2004-245987 A | 9/2004 |

* cited by examiner

*Primary Examiner*—Michael D Masinick
(74) *Attorney, Agent, or Firm*—Lerner, David, Littenberg, Krumholz & Mentlik, LLP

(57) ABSTRACT

A cooling apparatus able to rotate cooling fans with required lowest limit speeds, and able to suppress power consumption and generated noise includes a cooling unit for cooling an object to be cooled by a cooling amount in accordance with a level of a supplied drive signal; a temperature detector for detecting the temperature of the object; a drive circuit for amplifying the drive signal and supplying an output signal to the cooling unit; a memory for storing correction data for correcting circuit error in the drive circuit; and a control unit for generating the drive signal based on the detected temperature of the object, correcting error in the output signal of the drive circuit based on the correction data stored in the memory, and outputting the generated drive signal to the drive circuit. The cooling apparatus may be used in a projection type display device.

10 Claims, 7 Drawing Sheets

COOLING APPARATUS AND PROJECTION TYPE DISPLAY DEVICE

CROSS-REFERENCE TO RELATED APPLICATIONS

The present invention claims priority from Japanese Patent Application No. 2004-346642 filed on Nov. 30, 2004, the disclosure of which is hereby incorporated by reference herein.

BACKGROUND OF THE INVENTION

The present invention relates to a cooling apparatus of an optical device used as an illumination device of for example a liquid crystal projector or other display device and to a projection type display device.

A liquid crystal projector is a projector device using a spatial light modulator using a liquid crystal material (hereinafter referred to as a "liquid crystal panel"). In a liquid crystal projector, the liquid crystal panel per se does not emit light. Therefore, in a liquid crystal projector, a light source is combined with the liquid crystal panel to emit light to illuminate the liquid crystal panel. A video signal is applied to the liquid crystal panel to form an image by the liquid crystal panel which is then projected to a screen by a projection lens. A liquid crystal projector having such a configuration enables realization of a small sized, efficient projector device.

Since a liquid crystal projector focuses high energy light of the light source on to the liquid crystal panel through an illumination optical apparatus including a fly eye lens or a relay lens system and projects the image formed by the liquid crystal panel by a projection lens, various locations become high in temperature. For this reason, in a display device such as a liquid crystal projector, a cooling apparatus is provided for cooling the liquid crystal panel, circuits, light source lamp, power supply, and other parts becoming high in temperature in the device.

In general, a cooling apparatus for a liquid crystal projector or other display device measures the temperature of the high temperature parts using a temperature detection sensor, calculates a voltage to be supplied to a fan from the temperature or a temperature difference so as to obtain rotation of an electric fan required for cooling that temperature, converts the calculated result from a digital to analog format, and supplies the voltage to the electric fan through an amplification circuit (see for example Japanese Unexamined Patent Publication (Kokai) No. 4-60534).

In the above system, however, a voltage A' actually supplied to the fan for the calculated result A ends up being affected by the digital-analog conversion circuit and the amplification circuit, so has error. For this reason, the past cooling apparatus has the disadvantages of a large wasteful consumption of power and generation of noise. In order to eliminate this error, in the art, processing has been performed to sense the speed of the fan and feed it back so as to obtain the desired speed, but this was disadvantageous in that the system ended up becoming relatively large.

It is therefore desirable to provide a cooling apparatus able to operate a cooling fan with the required lowest limit of speed and able to suppress power consumption and generation of noise without inducing an increase of a system size and to provide a projection type display device using the same.

SUMMARY OF THE INVENTION

According to a first aspect of an embodiment of the present invention, there is provided a cooling apparatus including a cooling unit for cooling an object to be cooled by a cooling amount in accordance with a level of a supplied drive signal; a temperature detector for detecting the temperature of the object; a drive circuit for amplifying the drive signal and supplying an output signal to the cooling unit; a memory for storing correction data for correcting circuit error in the drive circuit; and a control unit for generating the drive signal based on the detected temperature of the object, correcting error in the output signal based on the correction data stored in the memory, and outputting the generated drive signal to the drive circuit.

According to a second aspect of an embodiment of the present invention, there is provided a cooling apparatus including a plurality of cooling units for cooling corresponding objects to be cooled by cooling amounts in accordance with levels of supplied drive signals; temperature detectors for detecting the temperatures of the objects; a plurality of drive circuits for amplifying the drive signals and supplying output signals to the corresponding cooling units; a plurality of memories for storing correction data for correcting circuit errors in the plurality of drive circuits; and a control unit for generating the drive signals based on the detected temperatures of the objects, correcting errors in the output signals based on the correction data stored in the memories, and outputting the generated drive signals to the corresponding drive circuits.

Preferably, the plurality of drive circuits and the plurality of memories are mounted as sets on different boards, and the control unit accesses the memories on the boards to obtain corrected outputs.

Preferably, the cooling unit includes a cooling fan, and the correction data stored in the memories are data obtained using a control temperature maximum value, a control temperature minimum value, a fan speed maximum value, and a fan speed minimum value as parameters.

Preferably, the cooling unit includes a cooling fan, the correction data stored in the memories define lines indicating an ideal circuit output and an actual circuit output using a control temperature maximum value, a control temperature minimum value, a fan speed maximum value, and a fan speed minimum value as parameters and include parameters in accordance with the lines as parameters corresponding to actual circuits and ideal parameters corresponding to ideal circuits, and the control unit links the parameters corresponding to actual circuits and ideal parameters corresponding to ideal circuits to the generated drive signals to obtain the corrected outputs.

According to a third aspect of an embodiment of the present invention, there is provided a projection type display device including a light modulating portion for modulating incident illumination light based on input image information and emitting modulated light; an illumination optical apparatus for focusing the illumination light from a light source upon the light modulating portion; a projection optical system for projecting the modulated light emitted from the light modulating portion; and a cooling apparatus for cooling at least one of the light modulating portion, the illumination optical apparatus, and the projection optical system, wherein the cooling apparatus includes a cooling unit for cooling an object to be cooled by a cooling amount in accordance with a level of a supplied drive signal, a temperature detector for detecting the temperature of the object, a drive circuit for amplifying the drive signal and supplying an output signal to the cooling unit, a memory for storing correction data for correcting circuit error in the drive circuit, and a control unit for generating the drive signal based on the detected temperature of the object, correcting error in the output signal based on the correction data stored in the memory, and outputting the generated drive signal to the drive circuit.

According to a fourth aspect of an embodiment of the present invention, there is provided a projection type display device including a light modulating portion for modulating an incident illumination light based on input image information and emitting modulated light; an illumination optical apparatus for focusing the modulated light from a light source upon the light modulating portion; a projection optical system for projecting the modulated light emitted from the light modulating portion; and a cooling apparatus for cooling at least one of the light modulating portion, the illumination optical apparatus, and the projection optical system, wherein the cooling apparatus includes a plurality of cooling units for cooling corresponding objects to be cooled by cooling amounts in accordance with levels of supplied drive signals, temperature detectors for detecting the temperatures of the objects, a plurality of drive circuits for amplifying the drive signals and supplying output signals to the corresponding cooling units, a plurality of memories for storing correction data for correcting circuit errors in the plurality of drive circuits, and a control unit for generating the drive signals based on the detected temperatures of the objects, correcting errors in the output signals based on the correction data stored in the memories, and outputting the generated drive signals to the corresponding drive circuits, the plurality of drive circuits and the plurality of memories being mounted as sets on different boards, and the control unit being operable to access the memories on the boards to obtain corrected outputs.

According to the embodiments of the present invention, the detected temperature of the object is input to the control unit. The control unit calculates the cooling amount required at present based on the detected temperature. The control unit generates a drive signal that gives, for example, the voltage required to control the speed of each cooling fan. Then, the control unit corrects circuit error in the output signal of each drive circuit based on the correction data stored in the memory and outputs the generated drive signal to the drive circuit. The drive circuit amplifies the control voltage from the control unit with a predetermined gain and applies the result as the drive signal to the corresponding cooling fan. As a result, the cooling fan rotates with a speed in accordance with the level of the drive signal, and the cooled object is cooled with an adequate cooling amount (air flow) according to need.

According to the embodiments of the present invention, there is an advantage in that each cooling fan can be operated with the required lowest limit of speed without inducing an increase in the system size, and the power consumption and the generated noise can be suppressed.

BRIEF DESCRIPTION OF THE DRAWINGS

These and other objects and features of the present invention will become clearer from the following description of the preferred embodiments given with reference to the attached drawings, wherein.

DETAILED DESCRIPTION

Below, embodiments of the present invention will be explained with reference to the attached drawings.

Figure 1:
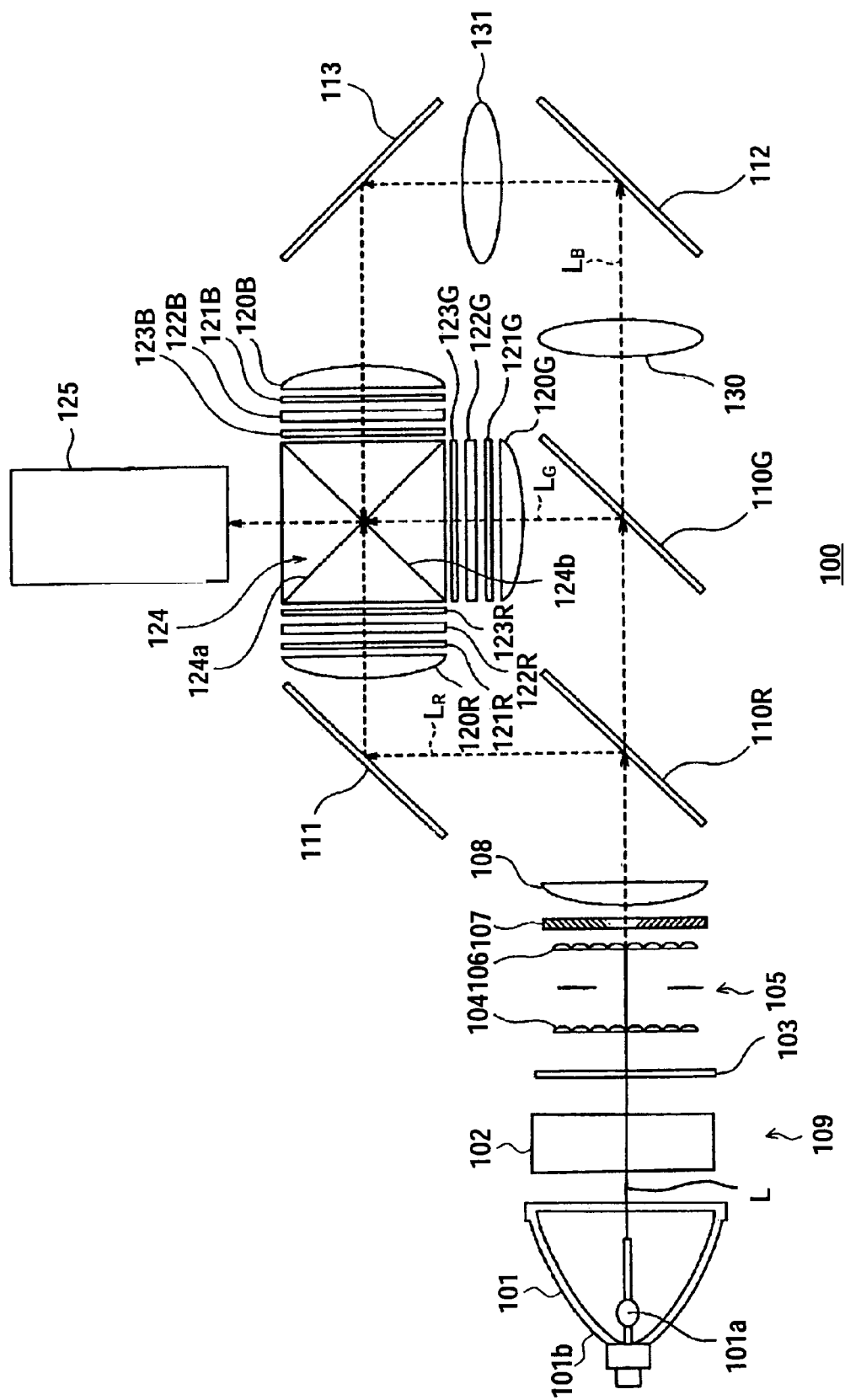
FIG. 1 is a diagram showing the principle of a liquid crystal projector (projection type display device) employing a cooling apparatus according to an embodiment of the present invention.
Figure 2:
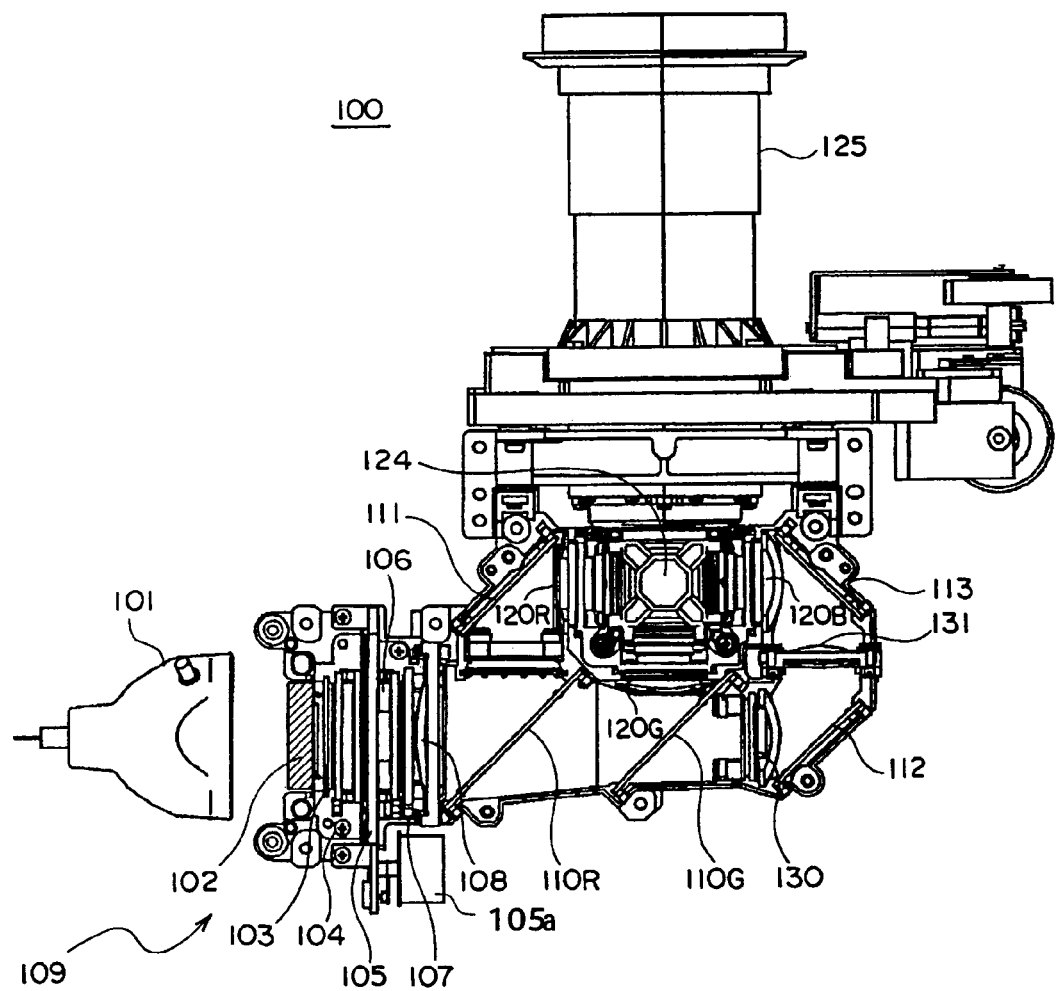
FIG. 2 is a diagram showing a liquid crystal projector (projection type display device) employing a cooling apparatus according to an embodiment of the present invention.
Figure 3:
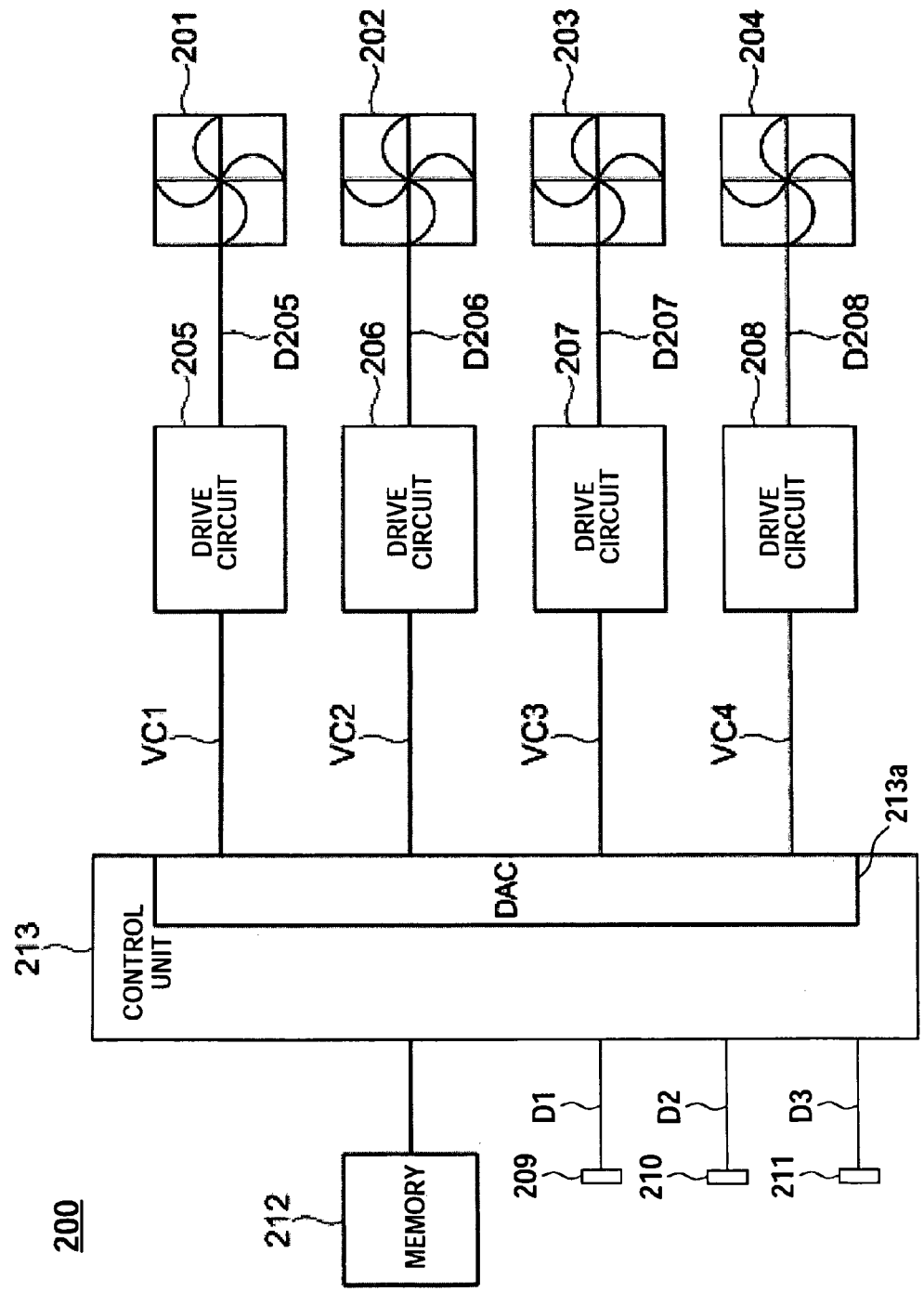
FIG. 3 is a system block diagram showing a control system of a cooling apparatus according to the present embodiment applied to the liquid crystal projector of FIG. 1 and FIG. 2.

FIG. 1 is a diagram showing the principle of a liquid crystal projector (projection type display device) according to an embodiment of the present invention. FIG. 2 is a diagram showing more specifically a liquid crystal projector (projection type display device) according to an embodiment of the present invention. FIG. 3 is a system block diagram of a control system of a cooling apparatus according to the present embodiment applied to the liquid crystal projector of FIG. 1 and FIG. 2.

The liquid crystal projector 100 is, as shown in FIG. 1 and FIG. 2, constituted by a light source 101, a collimator lens 102, an optical filter 103, a first multi-lens array (MLA) 104, an iris device 105, a second MLA 106, a polarization conversion device 107, a condenser lens 108, dichroic mirrors 110R and 110G, reflection mirrors 111, 112, and 113, condenser lenses 120R, 120G, and 120B, polarization plates 121R, 121G, and 121B, liquid crystal panels 122R, 122G, and 122B, polarization plates 123R, 123G, and 123B, a dichroic prism 124, a projection optical system 125, relay lenses 130 and 131, etc. The light source 101, collimator lens 102, optical filter 103, first MLA 104, iris device 105, second MLA 106, polarization conversion device 107, and condenser lens 108 form an illumination optical apparatus 109.

Further, in the liquid crystal projector 100 of the present embodiment, as shown in FIG. 3, a cooling apparatus 200 is provided for cooling the liquid crystal panels, circuits, light source lamp, power supply, and other parts becoming high in temperature in the apparatus.

The cooling apparatus 200 has cooling electric fans (hereinafter, referred to as "cooling fans") for the liquid crystal panels, power supply, light source lamp, etc. When controlling the speeds (cooling capability constituted by air flow) of these cooling fans, it lowers the speeds of the cooling fans as much as possible to suppress the consumed power or the generated noise. Since the drive circuits for driving the cooling fans include circuit errors, the cooling apparatus 200 previously stores data concerning these circuit errors in the memory, calculates the cooling amounts in accordance with the detected temperatures of the temperature detection sensor, corrects the errors of the drive circuits by the error data in the memory, and gives the results to the drive circuits. Namely, the cooling apparatus 200 is constituted so as to suppress the power consumption and the generated noise by correcting the supplied voltages of the cooling fans and operating them at the required lowest limits of speed. The cooling apparatus 200 of the present embodiment corrects the control voltages of the cooling fans for the following reason.

By using the values detected from the temperature detection sensor, the control unit calculates the cooling amounts required for the present temperature, and the control unit outputs control voltages Vc of the fans so as to obtain voltages Vt required for the fans. The voltages Vc are amplified α times at the amplifiers and supplied to the fans. This relationship becomes (Vt=αvc). In actuality, however, at the time of this amplification, α has error due to the circuits, so there is amplification error of a range of α±αe. The voltages output as the result become (α±αe)Vc, therefore Vc' for obtaining the required speeds must have a relationship of:

Vt<(α±αe)Vc'

Therefore, the following relationships stand:

αVc<(α±αe)Vc';

α/(α±αe)·Vc<Vcc'

Accordingly, the control unit must output a larger value as the difference αe becomes larger. At this time, the voltages Vt' output from the circuit vary from (α−αe)Vc' to (α+αe)Vc', therefore, due to the individual differences of the circuits, the speeds of the cooling fans vary. This is disadvantageous in view of the power consumption and the noise. Therefore, the cooling apparatus 200 of the present embodiment suppresses the variation of the outputs Vt' by storing information concerning the errors in the memory. This contributes to the reduction of the power consumption and the silence.

Below, the configurations and functions of the components of the liquid crystal projector 100 will be explained, then the specific configurations and functions of the cooling apparatus 200 will be explained.

The light source 101 is constituted by a discharge lamp 101a and a reflection condenser mirror 101b. The reflection condenser mirror 101b condenses the light emitted from this discharge lamp 101a and emits it toward the collimator lens 102.

The collimator lens 102 emits the illumination light L emitted from the light source 101 as parallel light beams toward the optical filter 103.

The optical filter 103 removes the unrequired light in an infrared ray region and an UV ray region included in the illumination light L emitted from the light source 101 and passed through the collimator lens 102.

The first MLA 104 divides the illumination light L from the light source 101 into a plurality of beams and arranges their optical images in the vicinity of the light incident surface of the second MLA 106. More specifically, the first MLA 104 has a plurality of lenses arranged in an array, divides the illumination light L into a plurality of images, condenses the divided images, and lays out light spots of the divided images at predetermined positions (the vicinity of the light incident surface of the second MLA 106).

The iris device 105 is arranged between the first MLA 104 and the second MLA 106 of the illumination optical apparatus 109 at an intermediate position between the two with schematically equal distances and concentrically opens/closes with respect to the light axis. The iris device 105 can be continuously variably operated so as to always give the optimum aperture opening in accordance with an average luminance level of the video signal so that an aperture opening ratio is large when the level is high and the aperture opening ratio is small when the level is low. The iris device 105 is controlled so that the illumination F number becomes the maximum on the black side.

Further, the iris device 105 is controlled so that the illumination F number becomes the minimum and the aperture opening ratio becomes 100% on the white side. The iris device 105 is structured so that the opening ratio will not become 0%. The iris device 105 has six or more iris blades having the same shape. These iris blades are synchronously opened/closed. The surfaces of the aperture blades are finished by gloss plating. In regions where the blades are superimposed on other blade surfaces, projections are provided so that point contact is possible. Further, the iris device 105 has a structure mounting a driving actuator and a blade opening position detection sensor in a heat insulated manner. The driving actuator is arranged on an emitting surface side with respect to the light source 101. Further, the iris device 105 has a structure forcibly cooling the driving actuator and has a structure forcibly cooling the blades of the illumination iris device and their peripheries. Further, the iris device 105 is constituted so as not to use an actuator operation stroke limit (mechanism end position). Further, as the drive source of the iris device 105, a galvanometer 105a (FIG. 2) is employed.

The second MLA 106 makes the divided light source images from the first MLA 104 strike the polarization conversion device 107 so that they can be incident as the illumination lights of the liquid crystal panels 122R, 122G, and 122B. In the second MLA 106, a plurality of levels corresponding to a plurality of light spots condensed by the first MLA 104 are arranged. The lenses superpose and combine divided images from the first MLA 104 for emission.

The polarization conversion device 107 is constituted by for example polarized beam splitters arranged in stripes and phase difference plates intermittently provided corresponding to them, transforms p-polarization components of the incident illumination light L to s-polarization components, and outputs the illumination light including many s-polarization components as a whole and having polarization directions aligned.

The condenser lens 108 condenses the lights so that the illumination lights L passed through the polarization conversion device 107 are overlapped on each other at the liquid crystal panels 122R, 122G, and 122B.

The dichroic mirror 110R is inclined by 45 degrees with respect to the light axis of the illumination lights L passed through the condenser lens 108 and having polarization directions aligned, reflects only a light LR in a red wavelength area among the illumination lights L toward the reflection mirror 111, and transmits lights LGB in other wavelength areas therethrough.

The reflection mirror 111 is inclined by 45 degrees with respect to the light axis of the light LR reflected at the dichroic mirror 110R and reflects the light LR toward the condenser lens 120R.

The dichroic mirror 110G is inclined by 45 degrees with respect to the light axis of the lights LGB transmitted through the dichroic mirror 110R, reflects only the light LG in the green wavelength area among the lights LGB transmitted through the dichroic mirror 110R toward the condenser lens 120G, and transmits the light LB in the other wavelength area (blue wavelength area) therethrough.

The relay lenses 130 and 131 are provided in order to focus the blue light LB again in the middle of the light path since the light path length from the dichroic mirror 110G of the light LB in the blue wavelength area to the liquid crystal panel 122B is relatively long. The blue light LB passed through the dichroic mirror 110G passes through the relay lenses 130 and 131 and is reflected toward the condenser lens 120G by the reflection mirror 113.

The condenser lenses 120R, 120G, and 120B and the liquid crystal panels 122R, 122G, and 122B are arranged at predetermined positions with respect to three side surfaces of the dichroic mirror 124 having a cubic shape. Further, on the incident side and the emitting side of the liquid crystal panels 122R, 122G, and 122B, the polarization plates 121R, 121G, and 121B as polarizers and the polarization plates 123R, 123G, and 123B as photodetectors are arranged in parallel. The polarization plates 121R, 121G, and 121B are fixed on the emitting side of the condenser lenses 120R, 120G and 120B, and the polarization plates 123R, 123G, and 123B are fixed to three surfaces on the incident side of the dichroic prism 124.

The liquid crystal panels 122R, 122G, and 122B modulate intensities of color beams LR, LG, and LB incident through the condenser lenses 120R, 120G, and 120B by the video signals corresponding to the applied three primary colors of red, green, and blue. Namely, the color beams LR, LG, and LB in the predetermined polarization directions transmitted through the polarization plates 121R, 121G, and 121B rotate in their polarization planes based on video signals applied to the liquid crystal panels 122R, 122G, and 122B. The predetermined polarization components of the lights receiving the rotation of the polarization planes pass through the polarization plates 123R, 123G, and 123B and strike the dichroic prism 124.

The dichroic prism 124 is constituted by for example a plurality of glass prisms joined together. At the joined surfaces of the glass prisms, interference filters 124a and 124b having predetermined optical characteristics are formed. The interference filter 124a reflects the blue light LB and transmits the red light LR and the green light LG therethrough. The interference filter 124b reflects the red light LR and transmits the green light LG and the blue light LB therethrough. Accordingly, the color beams LR, LG, and LB modulated by the liquid crystal panels 122R, 122G, and 122B are combined and strike the projection optical system 125.

The projection optical system 125 projects for example the image light incident from the dichroic prism 124 toward the projection surface of the screen etc. On the screen, a color image is projected.

The cooling apparatus 200 has for example cooling fans 201 to 204, drive circuits (amplifier circuits) 205 to 208, temperature detection sensors 209 to 211, a memory 212, and a control unit 213.

The cooling fan 201 cools the corresponding objects to be cooled, for example, a lamp ballast of the light source 101 and the iris device 105 of the illumination optical apparatus 109 by a speed (air flow) in accordance with the level (voltage value) of a drive signal D205 supplied by the drive circuit 205. The cooling fan 201 is constituted by for example a sirocco fan.

The cooling fan 202 cools the corresponding object to be cooled, for example, the prism system, by a speed (air flow) in accordance with the level (voltage value) of a drive signal D206 supplied by the drive circuit 206. The cooling fan 202 is constituted by for example a sirocco fan.

The cooling fan 203 cools the corresponding object to be cooled, for example, a power supply unit, by a speed (air flow) in accordance with the level (voltage value) of a drive signal D207 supplied by the drive circuit 207.

The cooling fan 204 cools the corresponding object to be cooled, for example, the lamp of the light source 101, by a speed (air flow) in accordance with the level (voltage value) of a drive signal D208 supplied by the drive circuit 208.

The drive circuit 205 amplifies a control voltage VC1 supplied by the control unit 213 with a predetermined gain and supplies the result as the drive signal D205 to the cooling fan 201.

The drive circuit 206 amplifies a control voltage VC2 supplied by the control unit 213 with a predetermined gain and supplies the result as the drive signal D206 to the cooling fan 202.

The drive circuit 207 amplifies a control voltage VC3 supplied by the control unit 213 with a predetermined gain and supplies the result as the drive signal D207 to the cooling fan 203.

The drive circuit 208 amplifies a control voltage VC4 supplied by the control unit 213 with a predetermined gain and supplies the result as the drive signal D208 to the cooling fan 204.

The temperature detection sensor 209 detects the temperature of the outside air and outputs a detection signal D1 to the control unit 213. The temperature detection sensor 210 detects the temperature in the vicinity of the light source lamp and outputs a detection signal D2 to the control unit 213. The temperature detection sensor 211 detects the temperature in the vicinity of the liquid crystal panel and outputs a detection signal D3 to the control unit 213.

The memory 212 is constituted by a nonvolatile memory such as an EEPROM and stores in advance the error data for correcting circuit errors of the drive circuits 205 to 208. The error data will be explained in detail later.

The control unit 213 calculates the cooling amount required at present based on the detection signals D1 to D3 of the temperature detection sensors 209 to 211, generates drive signals that give the voltages VC required for controlling the speeds of the cooling fans 201 to 204, corrects the circuit errors of the output signals D205 to D208 of the drive circuits 205 to 208 based on the correction data of the circuit errors stored in the memory 212 for the generated drive signals, and outputs the control voltages VC1, VC2, VC3, and VC4 to the drive circuits 205, 206, 207, and 208 for driving the corresponding cooling fans 201, 202, 203, and 204 through the digital-analog converter (DAC) 213a.

Below, a further detailed explanation will be given of the error data stored in the memory 212 and the generation of the control voltages VC1 to VC4 of the control unit 213.

Figure 4:
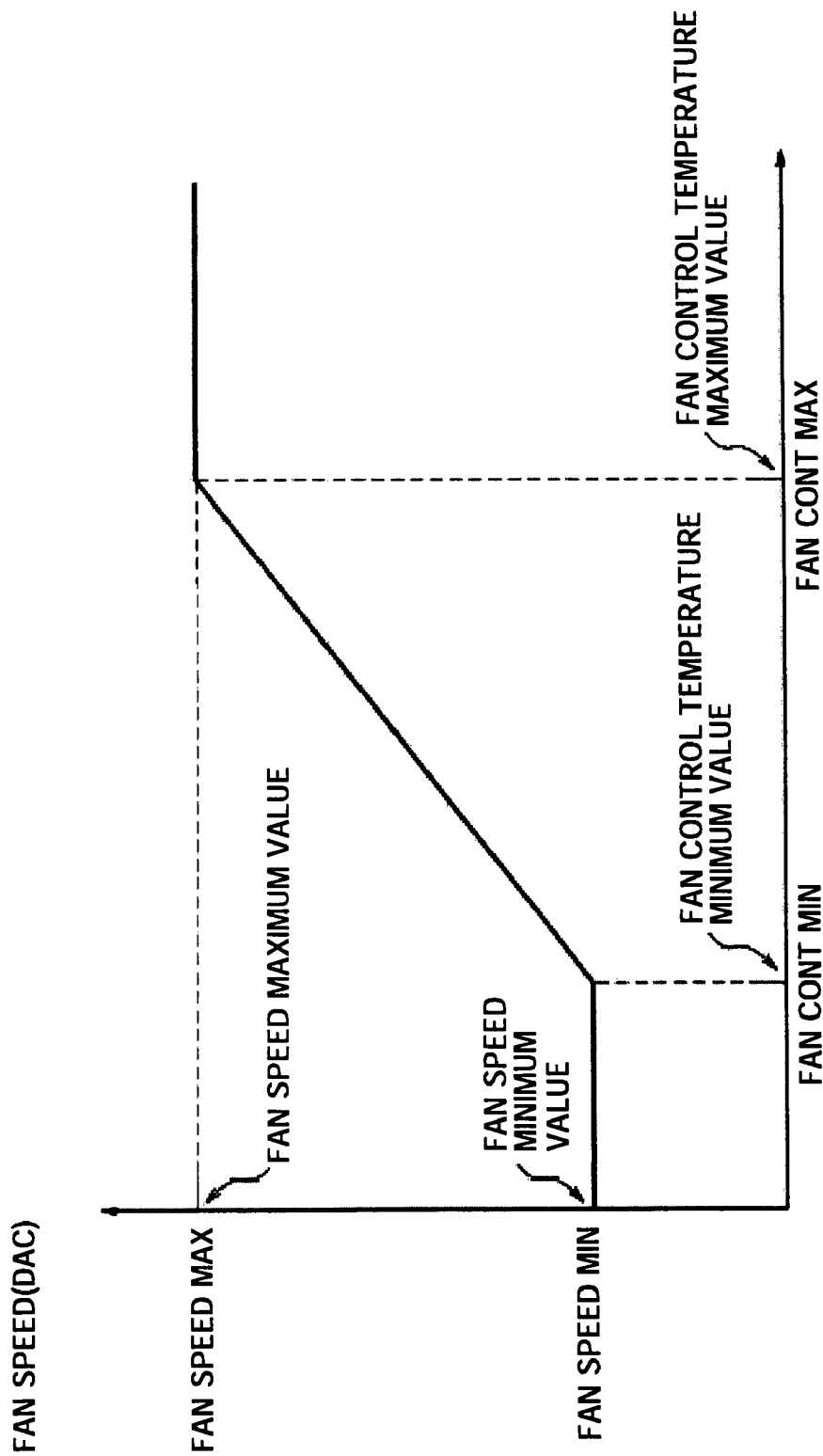
FIG. 4 is a graph explaining parameters for determining control curves of cooling fans.

FIG. 4 is a graph for explaining parameters for determining control curves of the cooling fans. In FIG. 4, the abscissa indicates the temperature, and the ordinate indicates the control voltage VC corresponding to the speed of a fan.

In the present embodiment, as parameters for determining control curves of the cooling fans, as shown in FIG. 4, four parameters are used. Namely, they are the four parameters of:

(1) FAN Cont Max: FAN control temperature maximum value;

(2) FAN Cont Min: FAN control temperature minimum value;

(3) FAN Speed Max: FAN speed maximum value; and (4) FAN Speed Min: FAN speed minimum value.

The control voltages VC are adjusted based on these four parameters. The FAN speed maximum value FAN Speed Max is output as the control voltage VC, for example, as a voltage of 210/255, by the control unit 213. The FAN speed minimum value FAN Speed Min is output as the control voltage VC, for example, as a voltage of 40/255, by the control unit 213.

For example, voltages of the drive signals of the drive circuits 205 to 208 after amplification have errors of about 300 mV when the errors are not corrected as in the present embodiment, but by supplying the corrected control voltages VC to the drive circuits 205 to 208, the errors can be suppressed to within ±50 mV of the desired voltage values.

Figure 5:
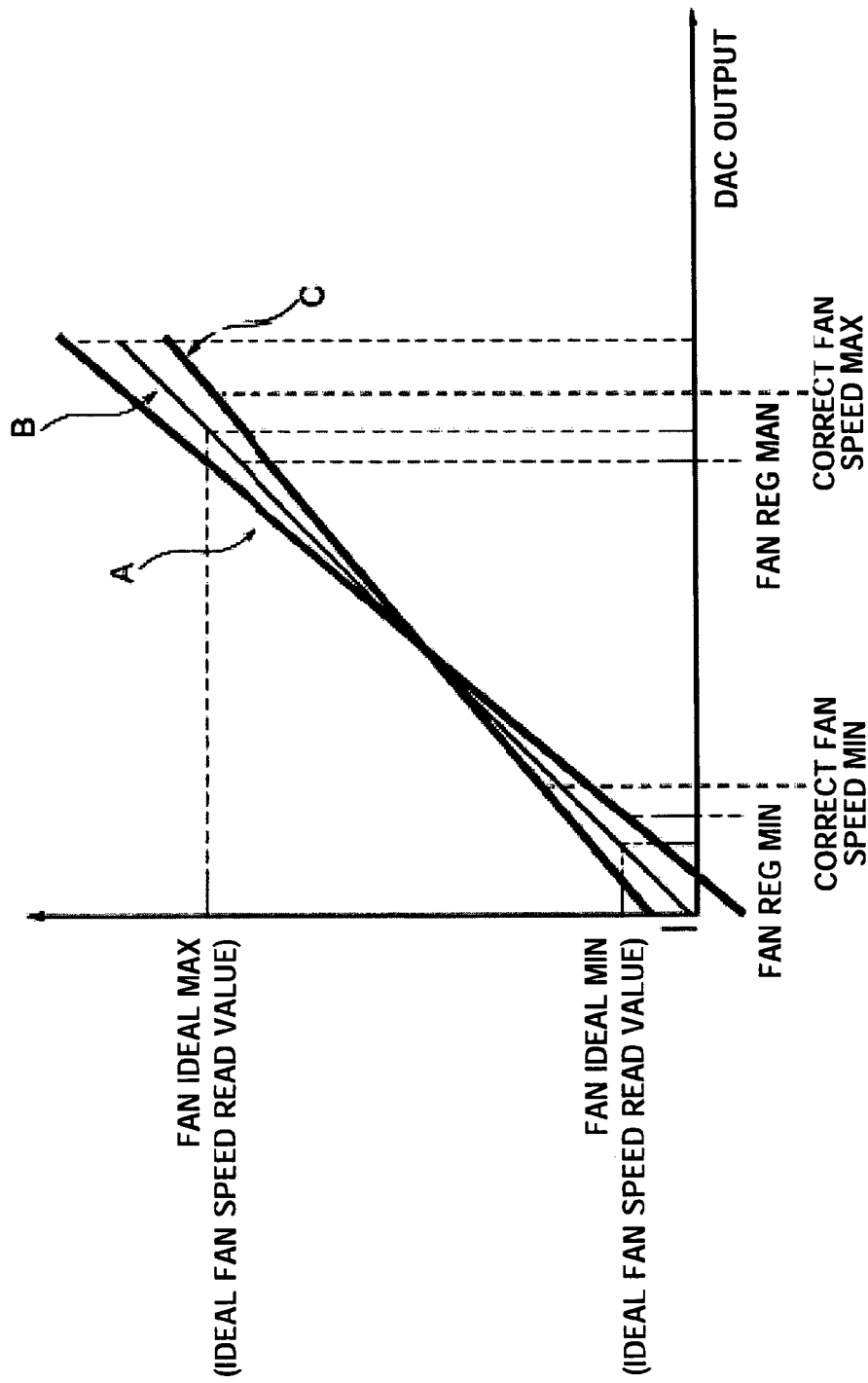
FIG. 5 is a graph explaining the principle of correction of a fan (FAN) control curve in the cooling apparatus of the present embodiment.

FIG. 5 is a graph for explaining the principle of the correction of the fan (FAN) control curves in the cooling apparatus 200 of the present embodiment. In FIG. 5, the abscissa indicates the output value of the DAC 213a of the control unit 213, and the ordinate indicates the relative value of the fan speed. In FIG. 5, a line indicated by A shows a voltage characteristic including variation, a line indicated by B shows an ideal voltage characteristic, and a line indicated by C shows a corrected voltage characteristic.

In the cooling apparatus 200, the control voltage VC (FAN Reg Max/Min) values of the cooling fans 201 to 204 are adjusted so that the outputs of the drive circuits 205 to 208 are the desired minimum/maximum voltage outputs and are stored in the memory 212.

In the cooling apparatus 200, by the control signal "FAN Reg Adj Cont", it is selected whether the mode is the normal control or control off (FAN voltage adjustment mode). At the time of the normal control mode, each fan speed (FAN Speed value) matching with the temperature is output from the calculated control curve. At the time of the control off mode, each FAN control voltage VC is output by calculating backward the DAC output value (D/A value, in actuality, the value of FAN Speed). Then, by depressing the memory key after adjusting the FAN Reg Max/Min, the value of each FAN Reg Max/Min is stored in the dedicated memory 212 for the fans.

The control unit 213 calculates the fan speed maximum value "FAN Speed Max" and the fan speed minimum value "FAN Speed Min" by using values of the corrected fan speed maximum value Correct FAN Speed Max and the corrected fan speed minimum value Correct FAN Speed Min considering the circuit errors (variation) of drive circuits 205 to 208 in the control curve calculation. The method of calculation of the corrected fan speed maximum value Correct FAN Speed Max and corrected fan speed minimum value Correct FAN Speed Min will be shown below.

At the time of calculation, use is made of the previously given FAN Speed Max/FAN Speed Min as the parameter of the initial value. When CFS: Correct FAN Speed (voltage variation correction value);
X1: FAN Reg Min;
X2: FAN Reg Max;
X1: FAN Ideal Min; and
Y2: FAN Ideal Max, the D/A output value Correct FAN Speed to be fund can be found by the following equation:

$$CFS=(X2-X1)/(Y2-Y1)*FS-Y1+(Y2-Y1)/(X2-X1)*X1$$

Figure 6:
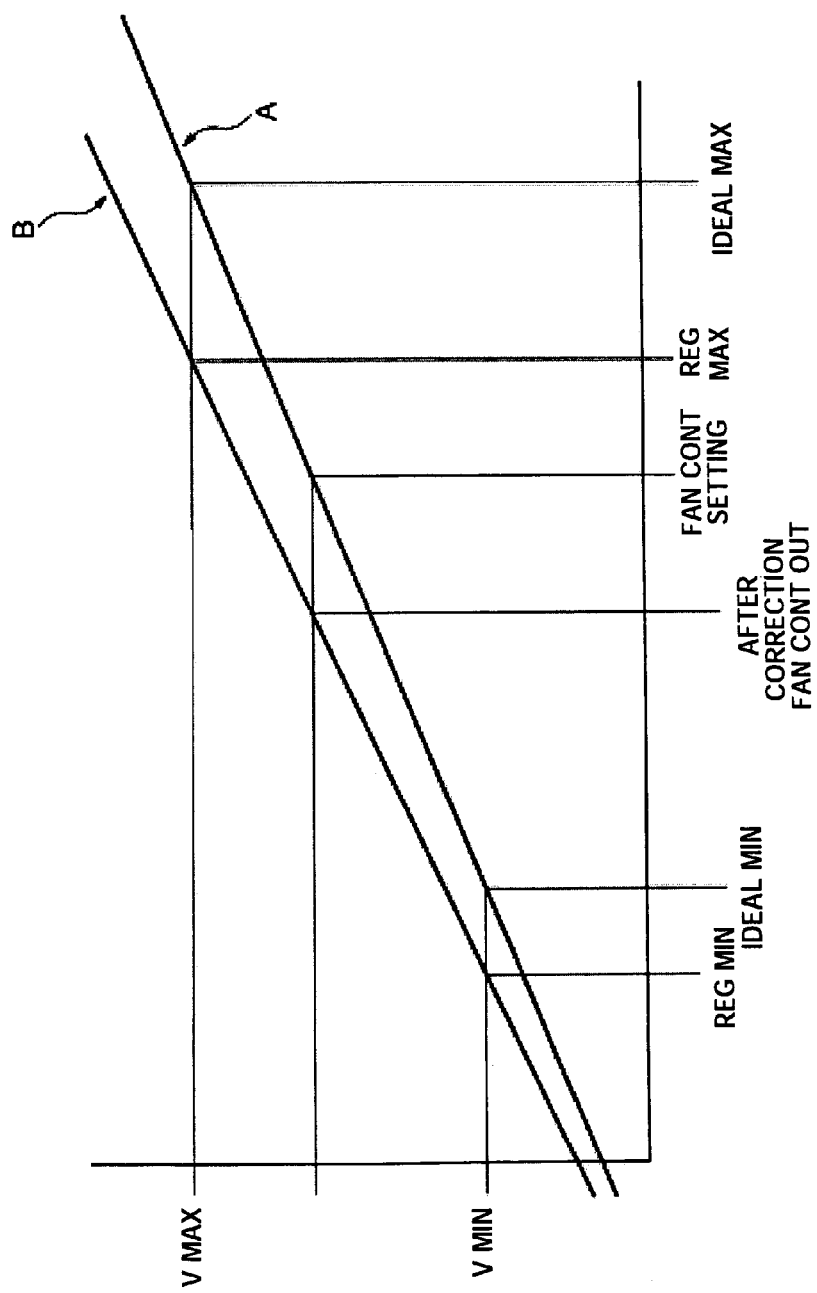
FIG. 6 is a graph showing a relationship between an ideal circuit output and an actual circuit output in the cooling apparatus.

In order to further facilitate understanding, this will be explained with reference to FIG. 6. FIG. 6 is a graph showing the relationship between the ideal circuit output and the actual circuit output in the cooling apparatus. In FIG. 6, the abscissa indicates the output of the DAC 213a of the control unit 213, and the ordinate indicates the output voltage of the drive circuit. The Vmax in FIG. 6 indicates the output value, and Vmin indicates the voltage to be output at the time of the ideal speed minimum value. Further in FIG. 6, the line indicated by A shows the ideal circuit output characteristic, and the line indicated by B shows the actual circuit output characteristic.

First, the equation of the line passing through two points becomes as follows:

$$Y=x*(y1-y2)/(x1-x2)+y1-x1*(y1-y2)/(x1-x2)$$

Accordingly, the ideal circuit output Ya and the actual circuit output Yb become as follows:

Ideal circuit output:

$$Ya=DAC\ Out\times(Vmax-Vmin)/(IdealMax-IdealMin)+\\Vmax-IdealMin\times(Vmax-Vmin)/(IdealMax-IdealMin)$$

Actual circuit output:

$$Yb=AC\ Out\times(Vmax-Vmin)/(RegMax-RegMin)+\\Vmax-RegMin\times(Vmax-Vmin)/(RegMax-RegMin)$$

The corrected Dac Out which must be actually output when it is intended to obtain the desired voltage Vout at the output control voltage (DAC Out) setting of the DAC 213a of the control unit 213 becomes as follows:

$$Vout=DAC\ Out\ setting\times(Vmax-Vmin)/(IdealMax-IdealMin)+$$

$$Vmax-IdealMin\times(Vmax-Vmin)/(IdealMax-IdealMin)$$

$$=DAC\ Out\ after\ correction\times(Vmax-Vmin)/RegMax-RegMin)+Vmax-RegMin\times(Vmax-Vmin)/(RegMax-RegMin)$$

When dividing both sides of this equation by (Vmax−VMin)/(RegMax−RegMin), the result becomes as follows:

$$DAC\ Out\ setting\times(RegMax-RegMin)/(IdealMax-IdealMin)$$

$$+Vmax/(RegMax-RegMin)-IdealMin\times(RegMax-RegMin)/(IdealMax-IdealMin)$$

$$=DAC\ Out\ after\ correction+Vmax/(RegMax-RegMin)-$$

RegMin

Namely, the corrected control voltage Vc, that is, Correct DAC Out, is obtained as follows:

Correct DAC Out=

$$DAC\ Out\ setting\times(RegMax-RegMin)/(IdealMax-IdealMin)-IdealMin\times(RegMax-RegMin)/(IdealMax-IdealMin)$$

+RegMin

In the cooling apparatus 200 having such a configuration, the detection signals D1 to D3 of the temperature detection sensors 209 to 211 are input to the control unit 213. The control unit 213 calculates the cooling amounts required at present based on the detection signals D1 to D3. The control unit 213 generates drive signals that give the voltages VC required for controlling the speeds of the cooling fans 201 to 204. Then, the control unit 213 corrects the circuit errors of the output signals D205 to D208 of the drive circuits 205 to 208 based on the correction data of the circuit errors stored in the memory 212 for generated drive signals and outputs the control voltages VC1, VC2, VC3, and VC4 to the drive circuits 205, 206, 207, and 208 for driving the corresponding cooling fans 201, 202, 203, and 204 through the digital-analog converter (DAC) 213a. In the drive circuits 205 to 208, the control voltages VC1 to VC4 from the control unit 213 are amplified with the predetermined gains and supplied as drive signals D205 to D208 to the corresponding cooling fans 201 to 204. As a result, the cooling fans 201 to 204 operate at speeds in accordance with the levels of the drive signals D205 to D208, and the light source lamp, iris device, power supply, etc. to be cooled are cooled with suitable air flows according to need.

According to the present embodiment, provision is made of cooling fans 201 to 204 for cooling corresponding objects to be cooled by speeds (air flows) in accordance with levels (voltage values) of the supplied drive signals D205 to D208, drive circuits 205 to 208 for amplifying control voltages VC1 to VC4 supplied by the control unit 213 with predetermined gains and supplying the results as drive signals D205 to D208 to the cooling fans 201 to 204, temperature detection sensors 209 to 211 for detecting the temperatures of the outside air, the vicinity of the light source lamp, and the vicinity of the liquid crystal panels, a memory 212 for storing error data in advance for correcting the circuit errors of the drive circuits 205 to 208, and a control unit 213 for calculating cooling amounts required a present based on detection signals D1 to D3 of the temperature detection sensors 209 to 211, generating drive signals that give the voltages VC required for controlling the speeds of the cooling fans 201 to 204, correcting circuit errors of output signals D205 to D208 of the drive circuits 205 to 208 based on the correction data of circuit errors stored in the memory 212 for generated drive signals, and outputting the control voltages VC1 to VC4 through the digital-analog converter (DAC) 213a to the drive circuits 205 to 208 for driving the corresponding cooling fans 201 to 204, therefore, it is possible to operate the cooling fans with the required lowest limits of speeds without inducing an increase of the system size.

Figure 7:
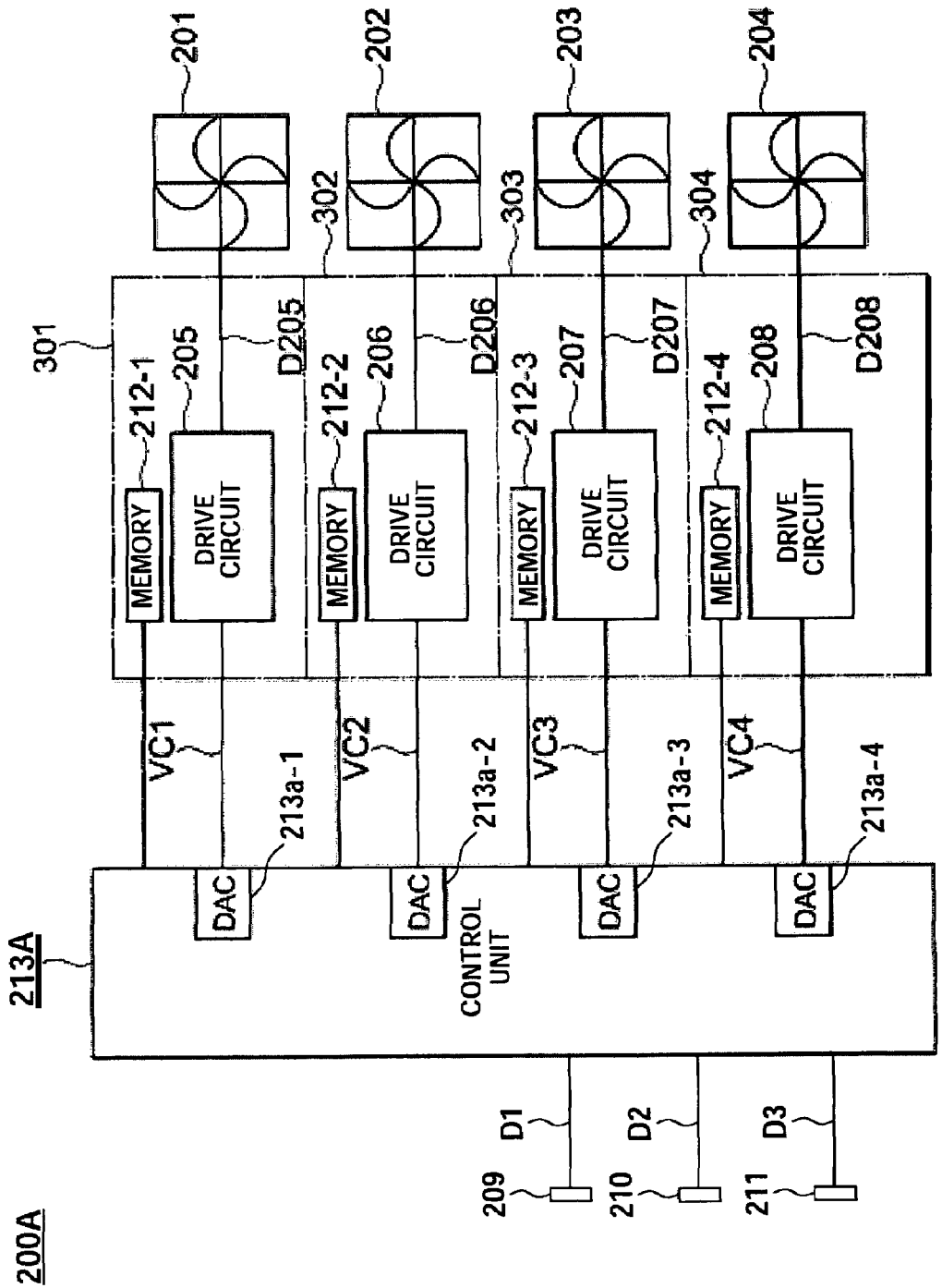
FIG. 7 is a system block diagram showing another example of the constitution of the control system of a cooling apparatus according to the present embodiment applied to the liquid crystal projector of FIG. 1 and FIG. 2.

Note that, in the embodiment explained above, the explanation was given of a configuration providing on memory 212 to store data concerning the circuit errors of a plurality of drive circuits, but for example, as shown in FIG. 7, when drive circuits 205A to 208A are mounted on a plurality of boards 301 to 304, it is also possible to configure the system so that memories 212-1 to 212-4 are provided on the boards 301 to 304, data concerning the circuit errors of the drive circuits mounted on the same boards are stored in the memories 212-1 to 212-4, and a control unit 213A such as a CPU accesses the memories 212-1 to 212-4 of the boards and outputs the correction control voltages VC. By employing such a constitution, the circuit error data can be stored in the memories of the same board for each drive circuit, therefore a cooling apparatus more suitable for practical use can be configured.

It should be understood by those skilled in the art that various modifications, combinations, sub-combinations, and alterations may occur depending on design requirements and other factors insofar as they are within the scope of the appended claims or the equivalents thereof.

The invention claimed is:

1. A cooling apparatus, comprising:
a cooling unit for cooling an object to be cooled by a cooling amount in accordance with a level of a supplied drive signal;
a temperature detector for detecting the temperature of the object;
a drive circuit for amplifying the drive signal and supplying an output signal to the cooling unit, in which the drive circuit produces a circuit error when amplifying the drive signal;
a memory for previously storing error correction data usable for correcting the circuit error produced by the drive circuit; and
a control unit for generating the drive signal based on the detected temperature of the object, correcting error in the output signal based on the correction data stored in the memory, and outputting the generated drive signal to the drive circuit,
in which the correction data stored in the memory is data obtained using a control temperature maximum value, a control temperature minimum value, a corrected fan speed maximum value, and a corrected fan speed minimum value as parameters.

2. A cooling apparatus as set forth in claim 1, wherein:
the cooling unit includes a cooling fan.

3. A cooling apparatus as set forth in claim 1, wherein:
the cooling unit includes a cooling fan,
the correction data stored in the memory defines an ideal circuit output and an actual circuit output using the control temperature maximum value, the control temperature minimum value, the fan speed maximum value, and the fan speed minimum value as parameters and includes parameters corresponding to actual circuits and ideal parameters corresponding to ideal circuits, and
the control unit links the parameters corresponding to actual circuits and ideal parameters corresponding to ideal circuits to the generated drive signal to obtain a corrected output.

4. A cooling apparatus, comprising:
a plurality of cooling units for cooling corresponding objects to be cooled by cooling amounts in accordance with levels of supplied drive signals;
temperature detectors for detecting the temperatures of the objects;
a plurality of drive circuits for amplifying the drive signals and supplying output signals to the corresponding cooling units, in which each of the drive circuits produces a circuit error when amplifying a respective drive signal;
a plurality of memories for previously storing error correction data usable for correcting the circuit errors produced in the plurality of drive circuits; and
a control unit for generating the drive signals based on the detected temperatures of the objects, correcting errors in the output signals based on the correction data stored in the memories, and outputting the generated drive signals to the corresponding drive circuits,
in which the correction data stored in the memories are data obtained using a control temperature maximum value, a control temperature minimum value, a corrected fan speed maximum value, and a corrected fan speed minimum value as parameters.

5. A cooling apparatus as set forth in claim 4, wherein:
the plurality of drive circuits and the plurality of memories are mounted as sets on different boards, and
the control unit accesses the memories on the boards to obtain corrected outputs.

6. A cooling apparatus as set forth in claim 5, wherein:
each cooling unit includes a cooling fan.

7. A cooling apparatus as set forth in claim 5, wherein:
each cooling unit includes a cooling fan,
the correction data stored in the memories define an ideal circuit output and an actual circuit output using the control temperature maximum value, the control temperature minimum value, the fan speed maximum value, and the fan speed minimum value as parameters and include parameters corresponding to actual circuits and ideal parameters corresponding to ideal circuits, and
the control unit links the parameters corresponding to actual circuits and ideal parameters corresponding to ideal circuits to the generated drive signals to obtain the corrected outputs.

8. A projection type display device, comprising:
a light modulating portion for modulating incident illumination light based on input image information and emitting modulated light;
an illumination optical apparatus for focusing the illumination light from a light source upon the light modulating portion;
a projection optical system for projecting the modulated light emitted from the light modulating portion; and
a cooling apparatus for cooling at least one of the light modulating portion, the illumination optical apparatus, and the projection optical system, the cooling apparatus including:

a cooling unit for cooling an object to be cooled by a cooling amount in accordance with a level of a supplied drive signal, a temperature detector for detecting the temperature of the object, a drive circuit for amplifying the drive signal and supplying an output signal to the cooling unit, in which the drive circuit produces a circuit error when amplifying the drive signal, a memory for previously storing error correction data usable for correcting the circuit error produced in the drive circuit, and a control unit for generating the drive signal based on the detected temperature of the object, correcting error in the output signal based on the correction data stored in the memory, and outputting the generated drive signal to the drive circuit, in which the correction data stored in the memory is data obtained using a control temperature maximum value, a control temperature minimum value, a corrected fan speed maximum value, and a corrected fan speed minimum value as parameters.

9. A projection type display device, comprising:

a light modulating portion for modulating an incident illumination light based on input image information and emitting modulated light;

an illumination optical apparatus for focusing the modulated light from a light source upon the light modulating portion;

a projection optical system for projecting the modulated light emitted from the light modulating portion; and a cooling apparatus for cooling at least one of the light modulating portion, the illumination optical apparatus, and the projection optical system, the cooling apparatus including:

a plurality of cooling units for cooling corresponding objects to be cooled by cooling amounts in accordance with levels of supplied drive signals, temperature detectors for detecting the temperatures of the objects, a plurality of drive circuits for amplifying the drive signals and supplying output signals to the corresponding cooling units, in which each of the drive circuits produces a circuit error when amplifying a respective drive signal, a plurality of memories for previously storing error correction data usable for correcting the circuit errors produced in the plurality of drive circuits, and a control unit for generating the drive signals based on the detected temperatures of the objects, correcting errors in the output signals based on the correction data stored in the memories, and outputting the generated drive signals to the corresponding drive circuits, the plurality of drive circuits and the plurality of memories being mounted as sets on different boards, and the control unit being operable to access the memories on the boards to obtain corrected outputs, in which the correction data stored in the memories are data obtained using a control temperature maximum value, a control temperature minimum value, a corrected fan speed maximum value, and a corrected fan speed minimum value as parameters.

10. A cooling apparatus, comprising:

a temperature detector for detecting a temperature of an object;

a memory for storing error correction data;

a control unit for generating a drive signal based on the temperature detected for the object, correcting an error in the drive signal based on the correction data stored in the memory, and outputting a generated error corrected drive signal;

a drive circuit for amplifying the generated error corrected drive signal so as to form an amplified drive signal and outputting the amplified drive signal; and a cooling unit for cooling the object by an amount in accordance with a level of the amplified drive signal, in which the drive circuit causes the error to be imposed to the drive signal during an amplifying operation, in which the correction data is previously stored in the memory prior to said amplifying operation and is utilized to correct the error in the drive signal produced by the drive circuit, and in which the correction data stored in the memory is data obtained using a control temperature maximum value, a control temperature minimum value, a corrected fan speed maximum value, and a corrected fan speed minimum value as parameters.

* * * * *